(12) United States Patent
Khazanov

(10) Patent No.: US 12,525,837 B1
(45) Date of Patent: Jan. 13, 2026

(54) STRESS CONTROL COATING FOR HIGH VOLTAGE CONDUCTOR INSULATION

(71) Applicant: National Electric Coil Company, LP, Columbus, OH (US)

(72) Inventor: Aleksandr Iosifovich Khazanov, Brownsville, TX (US)

(*) Notice: Subject to any disclaimer, the term of this patent is extended or adjusted under 35 U.S.C. 154(b) by 0 days.

(21) Appl. No.: 19/283,087

(22) Filed: Jul. 28, 2025

(51) Int. Cl.
*H02K 3/40* (2006.01)
*H02K 3/30* (2006.01)
*H02K 15/043* (2025.01)
*H02K 15/10* (2006.01)
*H02K 15/122* (2025.01)

(52) U.S. Cl.
CPC .............. *H02K 3/40* (2013.01); *H02K 3/30* (2013.01); *H02K 15/043* (2025.01); *H02K 15/10* (2013.01); *H02K 15/122* (2025.01)

(58) Field of Classification Search
CPC .. H02K 3/00; H02K 3/14; H02K 3/30; H02K 3/40; H02K 15/00; H02K 15/04; H02K 15/043; H02K 15/10; H02K 15/12; H02K 15/122; H02R 43/28; H01B 9/02; H01B 9/027; H02G 15/184
See application file for complete search history.

(56) References Cited

U.S. PATENT DOCUMENTS 3,878,319 A * 4/1975 Wahl .................. H01B 7/02
174/120 SR
4,001,616 A * 1/1977 Lonseth ................ H02K 3/40
174/DIG. 20

FOREIGN PATENT DOCUMENTS

JP 10174334 A * 6/1998

* cited by examiner

*Primary Examiner* — Tran N Nguyen
(74) *Attorney, Agent, or Firm* — Rock IP, PLLC

(57) ABSTRACT

A conductor and method of fabricating a conductor for a high voltage rotating machine. The conductor includes a conductor stack and conductor insulation surrounding the conductor stack. The conductor insulation includes a stress control coating. The stress control coating includes an inner layer including semiconducting paint, a middle layer including semiconducting tape, and an outer layer including semiconducting paint.

19 Claims, 6 Drawing Sheets

STRESS CONTROL COATING FOR HIGH VOLTAGE CONDUCTOR INSULATION

TECHNICAL FIELD

The present disclosure relates generally to a conductor for a High Voltage Rotating Machine (HVRM) and, more particularly, to insulation for a high voltage stator coil conductor and method of fabrication thereof.

BACKGROUND

A HVRM is a type of rotating machine that operates at voltages over 1,000 volts. HVRMs may operate as generators and motors. Generators convert rotating kinetic energy (e.g., from a rotating prime mover) to electrical power. Motors convert electrical power to rotating kinetic energy (e.g., for an external rotating load).

A conventional HVRM includes a rotor that is rotationally mounted inside of stator. The rotor is the rotating component of the HVRM, while the stator is stationary. Both the rotor and the stator include conductors known as windings. In general, the windings are formed from copper that is wrapped around or imbedded within a magnetic iron core. To avoid electrical contact between the windings and between the windings and the cores and manage dielectric stress, the conductors are provided with layers of insulation known as conductor insulation.

A conventional conductor insulation may comprise layers of: Inner Corona Protection (ICP), groundwall insulation, Outer Corona Protection (OCP), stress control coating, and sealing. The ICP is the innermost layer surrounding a conductor stack. The ICP is a layer of conductive tape that creates a Faraday Cage around the conductor to smooth the electrical field between the coil and groundwall insulation. The next layer is the groundwall insulation which electrically insulates the conductor stack from the stator core. The next layer is the OCP which is a layer of conductive tape that creates a Faraday Cage around the groundwall insulation to essentially eliminate the electrical field between the groundwall insulation and the stator core. Overlapping the OCP is the stress control coating which serves the purpose of limiting surface voltage gradient by providing surface conductivity along the surface of the insulation. A final layer of sealing may include a wrap of sealing tape or coat of paint which insulates the conductor from environmental conditions.

The stress control coating is formed of a grading coating material. Conventionally, the grading coating material has been formed by a wrap of semiconducting tape. However, when the tape is wrapped, voids can form between the conductor and the tape or between wraps of the tape. These voids create areas where conductivity is interrupted and can result in surface corona or partial discharges which can damage the grading coating and conductor insulation resulting in degrading of the conductor insulation which reduces the lifespan of the insulation.

The disclosed stator coil and methods of fabrication are directed at overcoming one or more of the problems set forth above and/or other issues in the prior art.

SUMMARY

In one aspect of the present disclosure, a conductor for a high voltage rotating machine is disclosed. The conductor includes a conductor stack and conductor insulation surrounding the conductor stack. The conductor insulation includes a stress control coating. The stress control coating includes an inner layer including semiconducting paint, a middle layer including semiconducting tape, and an outer layer including semiconducting paint.

In another aspect of the present disclosure, a method of fabricating a conductor of a high voltage machine is disclosed. The method includes the steps of applying a stress control coating to an insulated conductor. The step of applying the stress control coating includes coating the insulated conductor with at least one coat of semiconducting paint, wrapping the coated conductor with at least one wrap of semiconducting tape, and coating the wrapped conductor with at least one coat of semiconducting tape.

These and other features are explained more fully in the embodiments illustrated below. It should be understood that in general the features of one embodiment also may be used in combination with features of another embodiment and that the embodiments are not intended to limit the scope of the invention.

DETAILED DESCRIPTION

Figure 1:
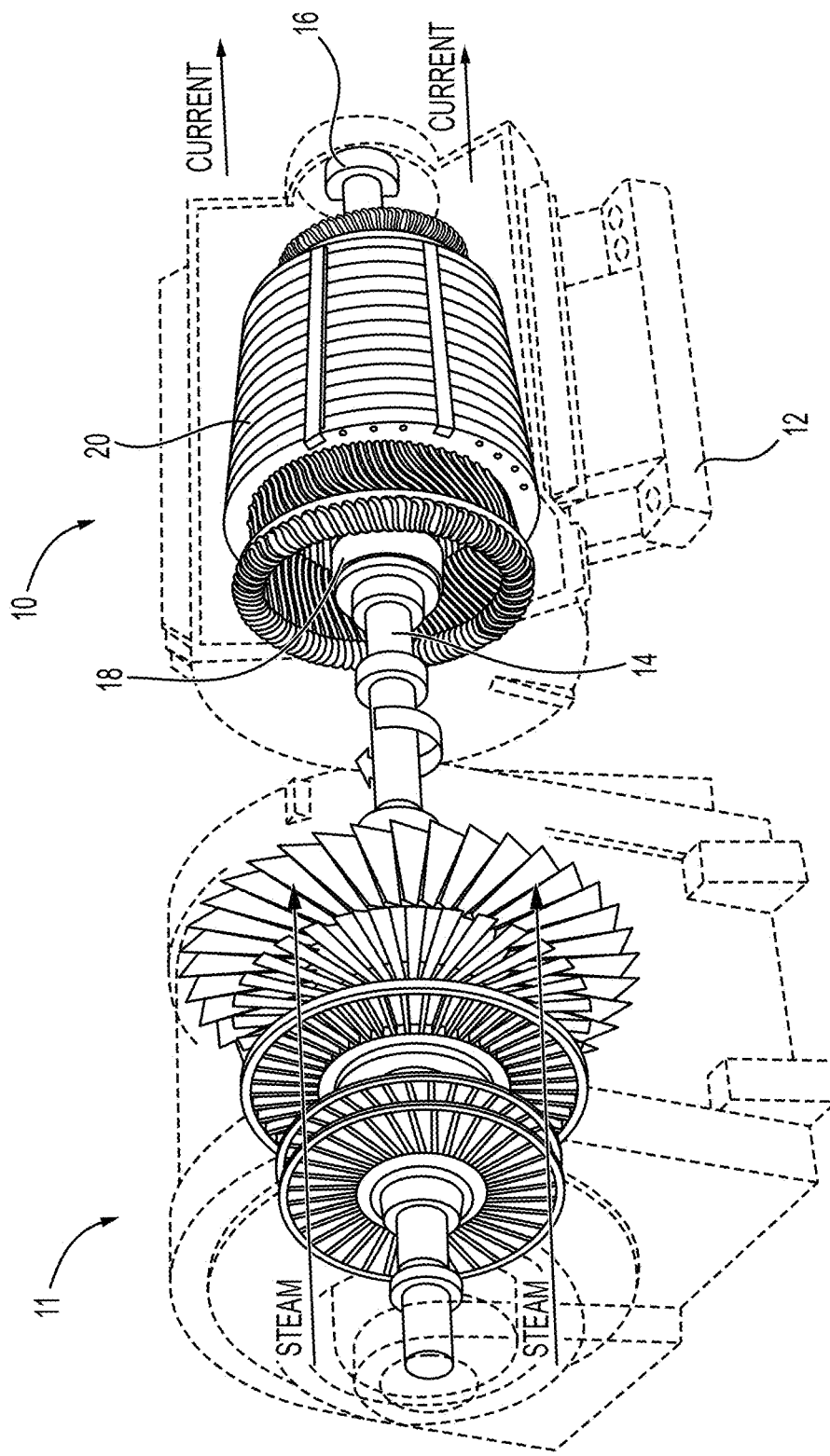
FIG. 1 is a diagrammatic illustration of an exemplary disclosed HVRM.

FIG. 1 illustrates an exemplary HVRM 10 functioning as a generator. In this example, HVRM 10 is mechanically driven by gas turbine 11 (e.g. a turbine driven by a flow of pressurized fluid such as steam from a nuclear reactor or other heat source) to produce electricity. It should be noted, however, that HVRM 10 could alternatively function as a motor to mechanically drive a mechanical drive or selectively function as both a generator and a motor. It should also be noted that, while HVRM 10 is illustrated in a horizontal orientation as shown in FIG. 1, an HVRM may be configured in vertical and other orientations. Other example applications of HVRM include gas turbine generators, hydroelectric generators, compressor motors, extruder motors, and fan motors.

Regardless of the orientation or intended application, HVRM 10 may include, among other things, a housing 12, a shaft 14 rotatably supported within housing 12 by one or more bearings 16, a rotor 18 operatively coupled with shaft 14, and a stator 20 that annularly surrounds rotor 18. When shaft 14 is mechanically driven to rotate within bearings 16 (e.g., by a turbine 11 also connected to shaft 14), rotor 18 may likewise rotate and interact with a stationary magnetic field of stator 20 to produce electricity. Conversely, when current is passed through stator 20, the resulting magnetic field may cause rotor 18 and connected shaft 14 to rotate. Stator 20 may be fixed to housing 12 and include components that produce the stationary magnetic field described above. It is contemplated that HVRM 10 may contain additional or different components than those depicted in FIG. 1 such as, for example, bushings, circuit rings, phase rings, buss work, and/or other components known in the art.

Figure 2A:
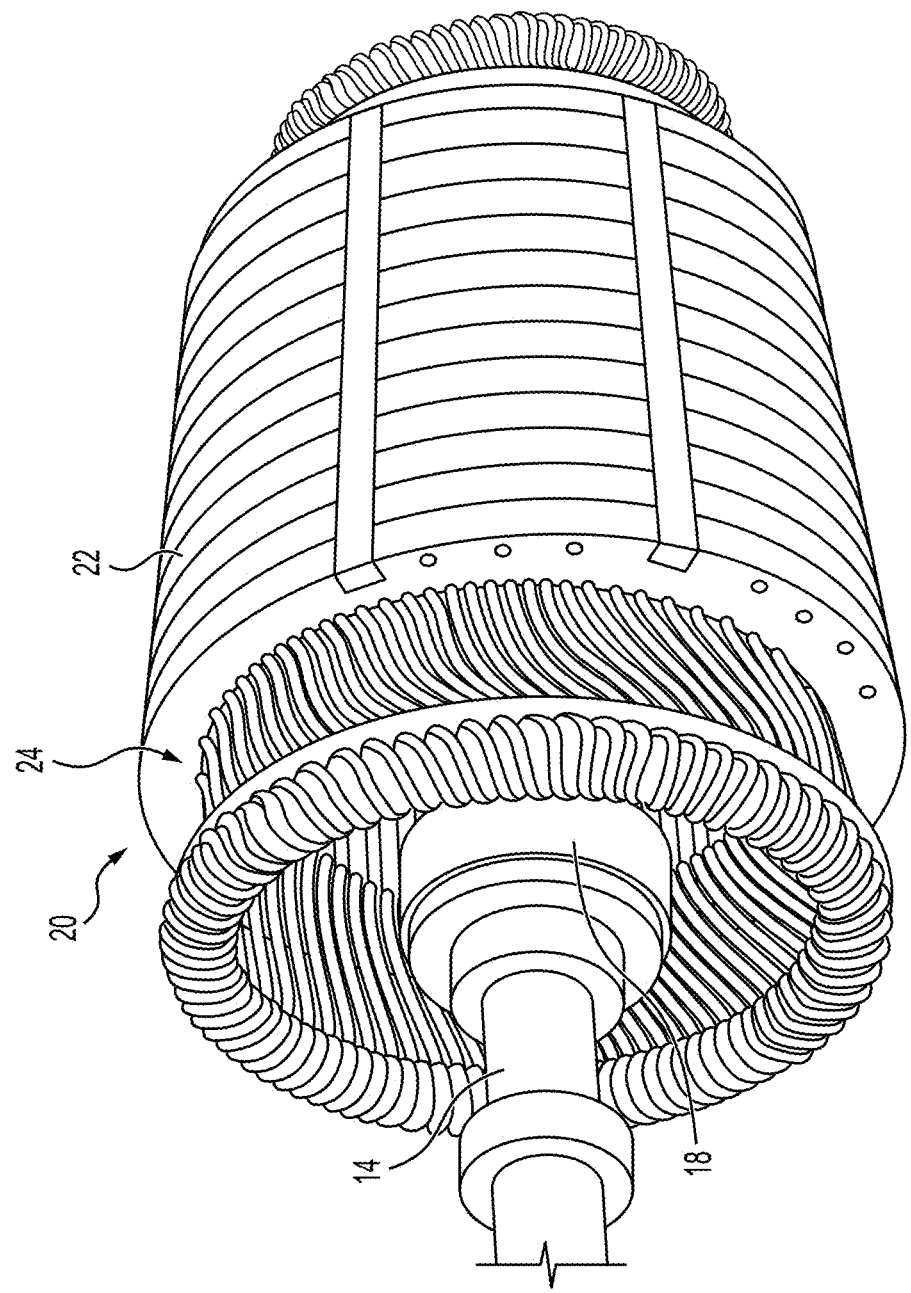
FIG. 2A is an exploded view illustration of an exemplary rotor and stator that may form a portion of the HVRM of FIG. 1.
Figure 2B:
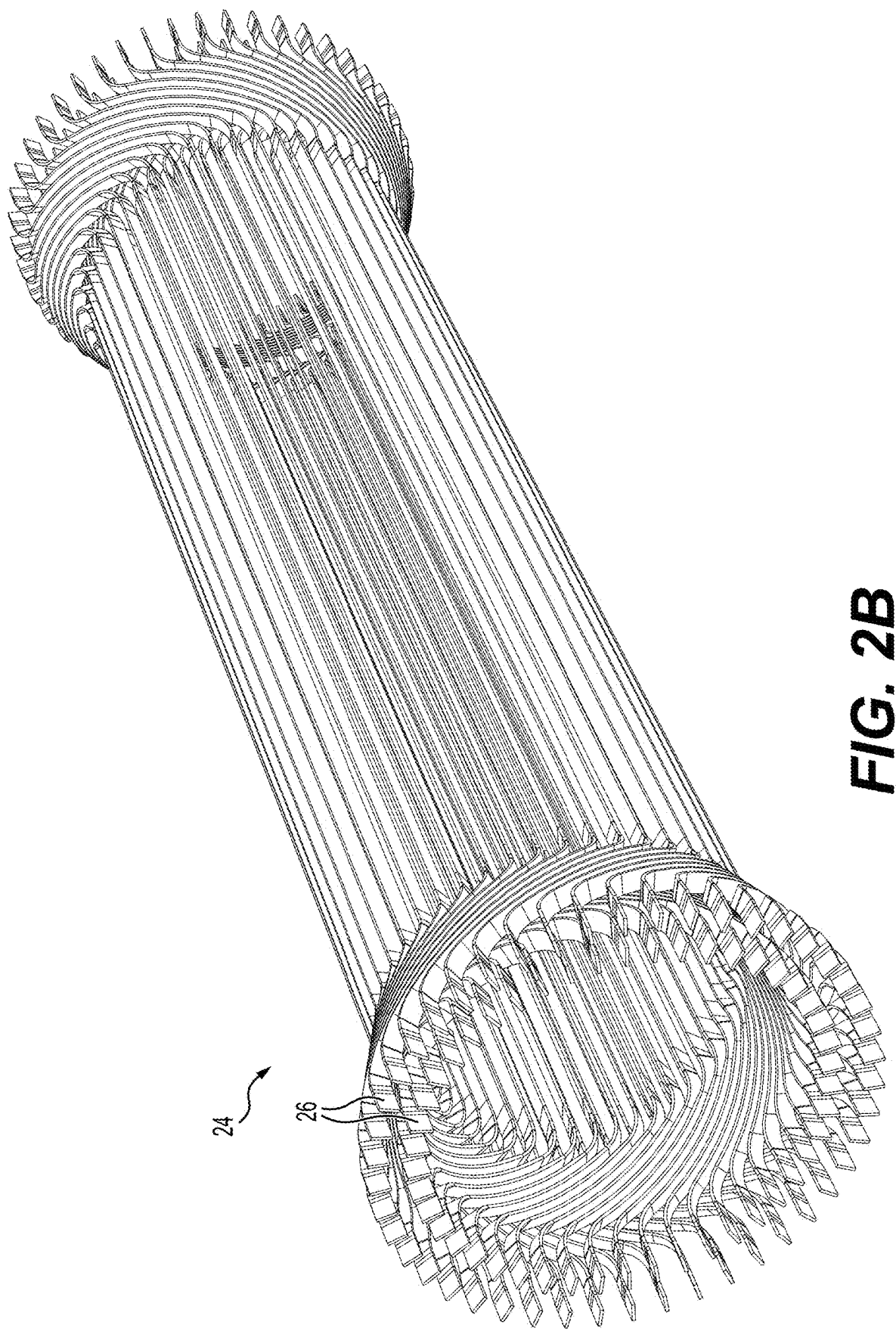
FIG. 2B is an exploded view illustration of an exemplary stator that may form a portion of the HVRM of FIG. 1.

As shown in FIGS. 2A and 2B, stator 20 may include a core 22 and a plurality of coils 26 arranged to form a stator winding 24. Coil 26 comprises a longitudinal section referred to as the slot section and a section referred to as the end-turn where coil 26 is electrically connected.

Figure 3:
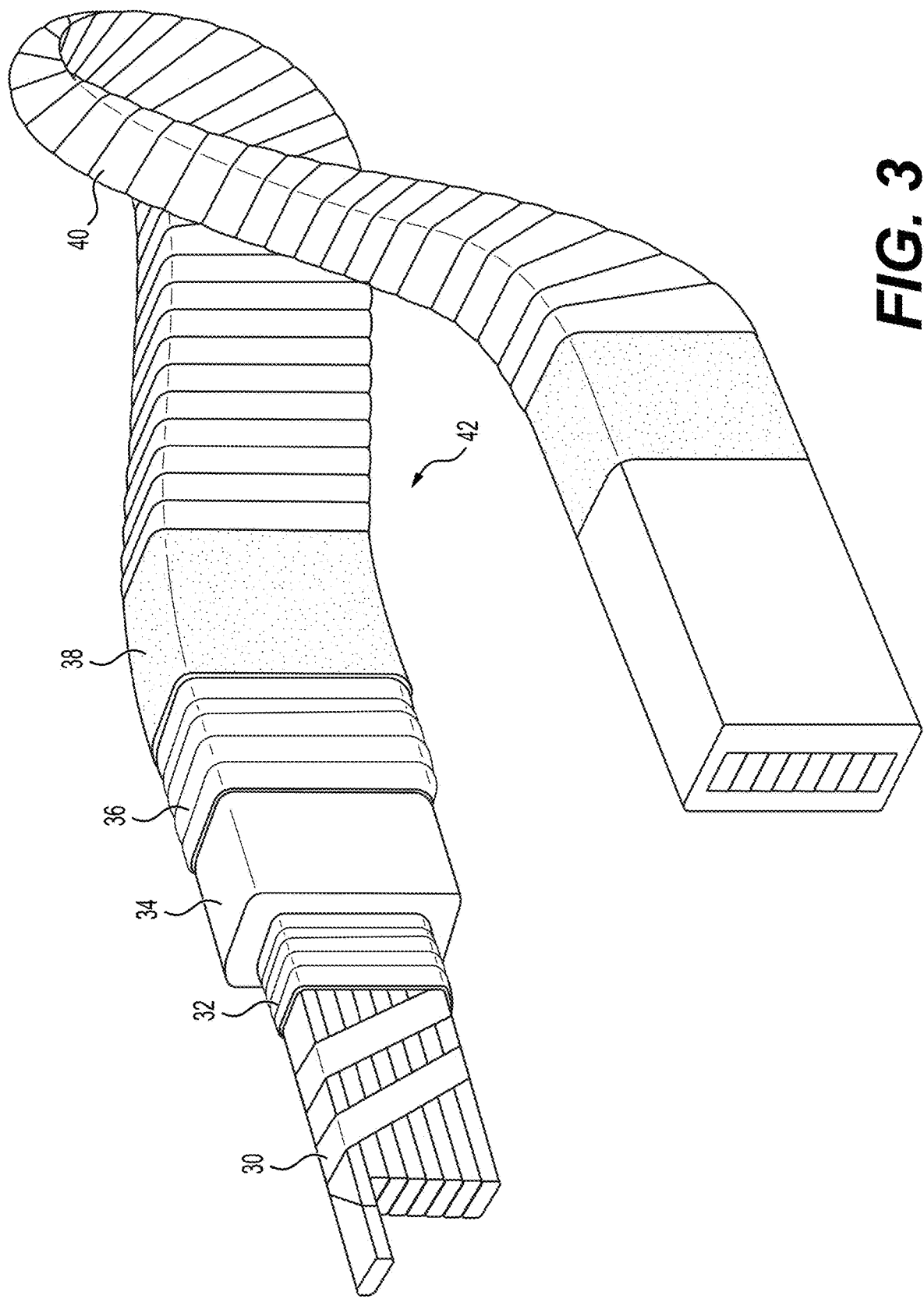
FIG. 3 is a sectional view illustration of an exemplary stator coil.

FIG. 3 illustrates a sectional view of an exemplary stator coil 26. Conductor stack 30 comprising wire which carries current along the length of coil 26. Surrounding the conductor stack is conductor insulation which electrically insulates coil 26 from the core 22. Conductor insulation comprises layers of: Inner Corona Protection (ICP) 32, groundwall insulation 34, Outer Corona Protection (OCP) 36, stress control coating 38, and Sealing 40. ICP 32 is the innermost layer surrounding conductor stack 30. ICP 32 is a layer of conductive tape that creates a Farraday Cage around the conductor to smooth the electrical field between conductor stack 30 and groundwall insulation 34. The next layer is groundwall insulation 34 electrically insulates conductor stack 30 from stator core 22. The next layer is OCP 36 which is a layer of conductive tape that creates a Farraday Cage around groundwall insulation 34 to eliminate the electrical field between groundwall insulation 34 and core 22. The next layer is stress control coating 38 which overlaps the OCP and extends into the end-turn of coil 26 and provides surface conductivity in order to limit surface voltage gradient. A final layer of sealing 40 includes a wrap of sealing tape or paint which insulates the conductor from environmental conditions.

INDUSTRIAL APPLICABILITY

In operation, a large voltage differential exists between the ground at groundwall insulation 34 and the high voltage at the end-turn of stator coil 26. The voltage differential over the insulation at the end of the outer grounded surface results in extremely high voltage gradient (e.g. electrical stress) building along the groundwall insulation surface that results in coronal discharges that deteriorate the conductor insulation. Stress control coating 38 provides a voltage gradient lower than a corona inception voltage along the insulated surface of the groundwall at the end-turn of the coil. A stress control coating with an even voltage gradient increases the durability and lifespan of the insulation by eliminating surface discharges.

Figure 4:
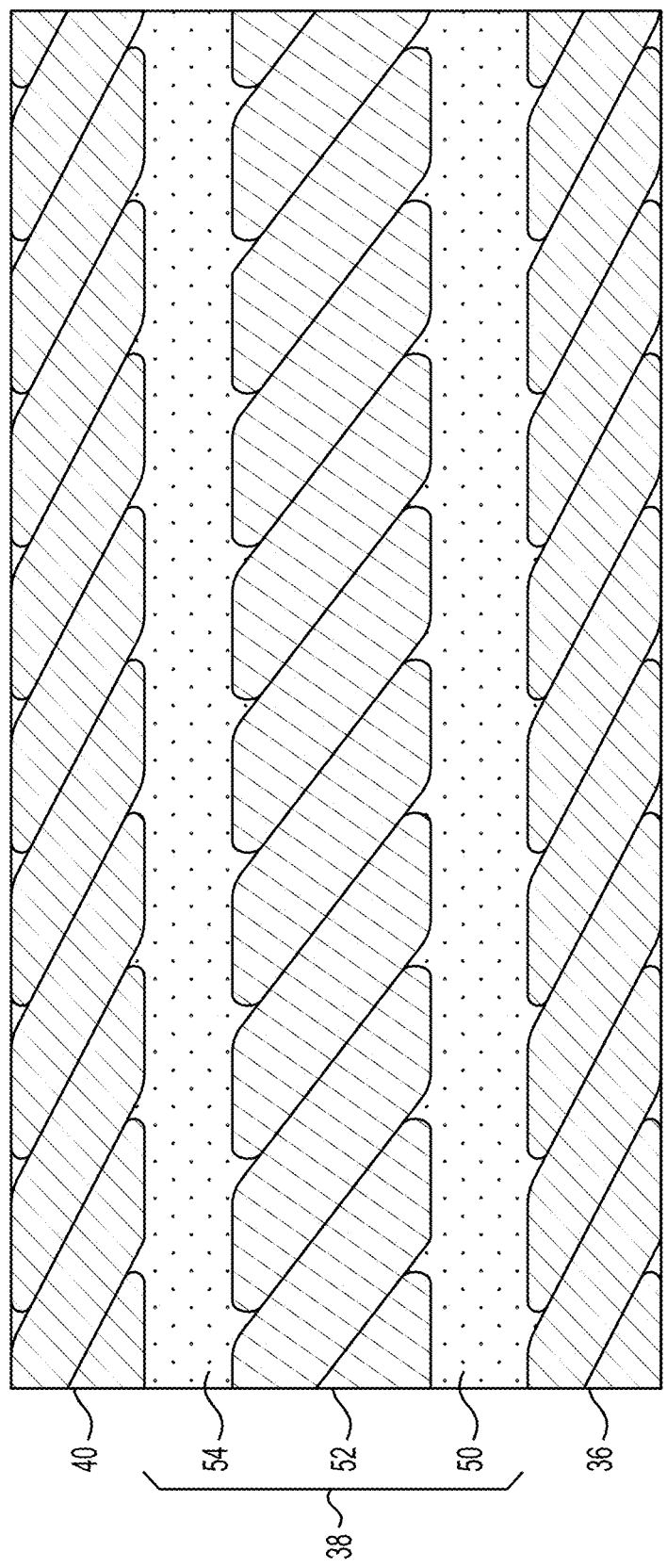
FIG. 4 is a cross-sectional view illustration of a stress control coating of the exemplary stator coil of FIG. 3.

As shown in FIG. 4, stress control coating 38 comprises an inner layer of semiconducting paint 50, a middle layer 52 of semiconducting tape, and an outer layer 54 of semiconducting paint. stress control coating 38 is applied in an area overlapping the slot section and an end-turn 42 of coil 26. The length of stress control coating 38 is determined based upon the rated voltage requirement—that is the length of stress control coating that results in zero voltage differential between the conductor and insulation surface at the maximum rated voltage. For example, for a stator coil winding rated at 20 kV, a stress control coating with a length of at least 10 inches is required to optimize performance. In another example, such as when the coil is prepared for voltage endurance and destructive testing where the voltage is operated at higher than ordinary rated voltages, stress control coating 38 may cover the entire length of the coil. In some embodiments, only inner layer 50 of semiconducting paint layer is applied for the entire length of the grading. In this embodiment middle layer 52 and outer layer 54 are applied only for a portion of the length from end-turn 42, for example a length of three-quarters of an inch past OCP layer 36. Covering the entire end-turn serves the additional purpose of electrical field stress mitigation between the coils installed in the stator.

Stress control coating 38 is assembled to minimize voids in the conductor insulation. Inner layer 50 has at least one coat of semiconducting paint applied over the previous layers of conductor insulation and overlaps OCP layer 36. Inner layer 50 smooths high and low points in the conductor insulation and improves contact for middle layer 52. In some embodiments, the paint is dried and then thermally cured to improve thermal stability. In some embodiments multiple coats of paint may be applied to increase the current carrying load capacity of the coil. In some embodiments the paint is dried and thermally cured between each coat, while in other embodiments the paint is only dried between coats and thermally cured only after the final coat of inner layer 50 is applied.

In an embodiment, the semiconducting paint comprises semiconducting particles, for example silicon carbide, filled epoxy resin. The semiconducting paint may have a 70-75% particle content by volume. The semiconducting particles are formed of an average shape and size to allow for significant particle interlock, for example 5-40 microns. In some embodiments a solvent may be mixed with the paint to achieve a desired viscosity for application.

Middle layer 52 of semiconducting tape is wrapped over inner layer 50 of semiconducting paint. Middle layer 52 increases the current carrying capacity of stress control coating 38. In some embodiments the tape is wrapped with at least ½ lap (e.g. where a turn of tape overlaps half the width of the previous turn of tape). Increased laps, such as ¾ lap, may be used when the tape is required to carry a higher current load. The tape may be wrapped in multiple layers to increase thermal capacity. In some embodiments, the tape is cured after each layer to improve thermal stability. In other embodiments, the tape is cured after the final layer is applied. The tape may be cured by applying positive pressure and heat to the tape wrap.

In an embodiment, the semiconducting tape is a resin-rich fiber impregnated with semiconducting particles. In some embodiments the fiber may comprise polyester fiber and glass fiber. In some embodiments the fiber is impregnated with silicon carbide filled epoxy resin as the semiconducting particles. The semiconducting tape may be configured to shrink when cured to minimize voids in the wrap.

Outer layer 54 of semiconducting paint is applied over middle layer 52 of semiconducting tape. Outer layer 54 fills in any voids in the tape wrap of middle layer 52. Transient changes in resistance are minimized and the durability of the stress control coating 38 is improved by eliminating voids in the semiconducting tape. In some embodiments, the paint is dried and then thermally cured to improve thermal stability. In some embodiments multiple coats of paint may be applied to increase the current carrying load capacity of the coil. In some embodiments the paint is dried and thermally cured between each coat, while in other embodiments the paint is only dried between coats and thermally cured only after the final coat of outer layer 52 is applied.

Figure 5:
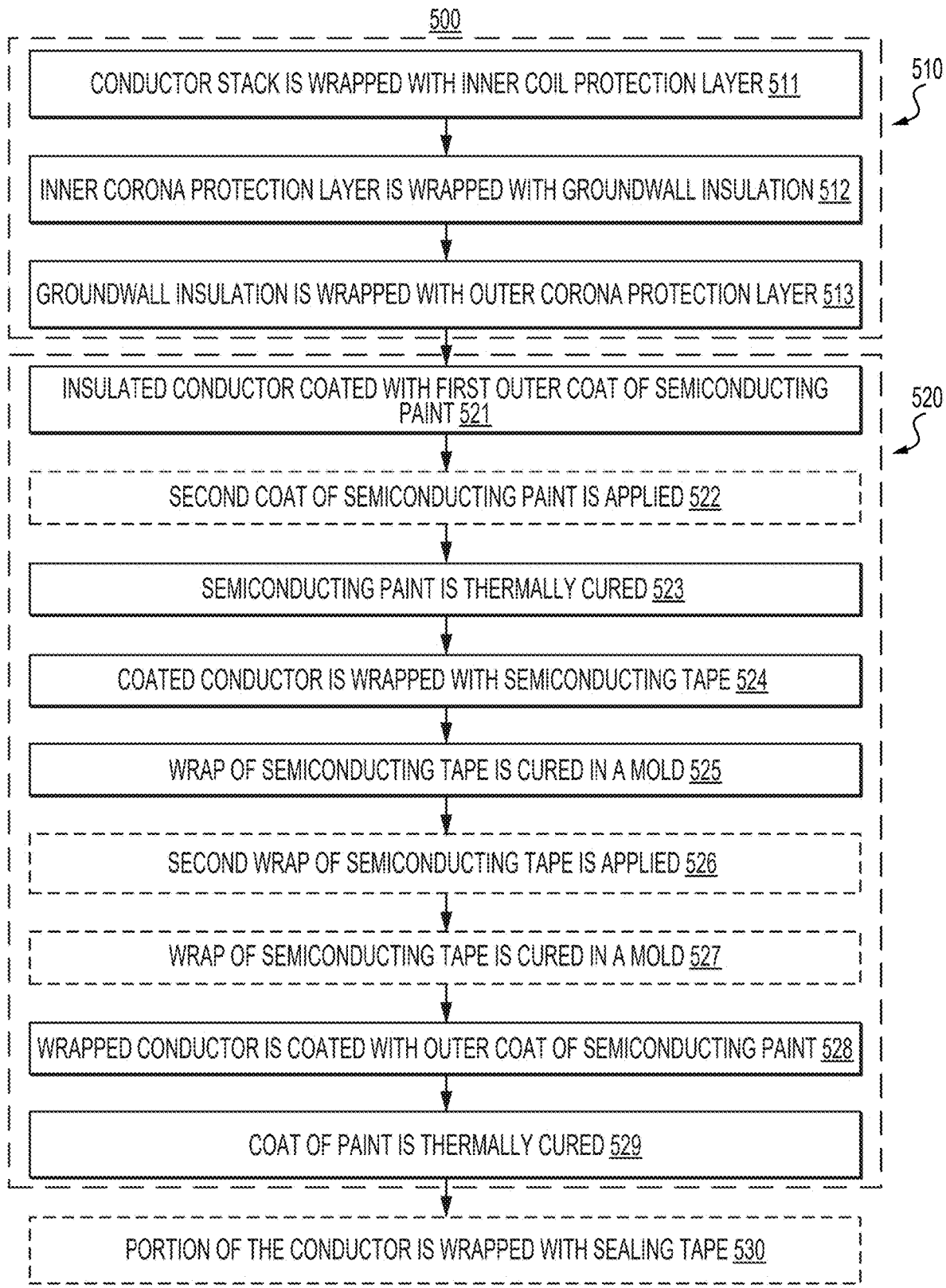
FIG. 5 is an exemplary fabrication method of conductor insulation.

FIG. 5 illustrates an exemplary method 500 of fabricating conductor insulation for a stator coil. The method begins by forming an insulated conductor in steps 510 by first in step 511, a conductor stack is wrapped with an inner coil protection layer. Next in step 512, the inner corona protection layer is wrapped with groundwall insulation. And in step 513, the groundwall insulation is wrapped with an outer corona protection layer. The method proceeds by applying a stress control coating to the insulated conductor end-turn in step 520. The stress control coating is applied first, in step 521, by coating the insulated conductor with a first outer coat of semiconducting paint for a first length based on the current capacity requirement of the stator coil. After the first coat of semiconducting paint has dried, optionally in step 522 a second coat of semiconducting paint is applied. After the second coat of semiconducting paint dries, the method proceeds to step 523 where the semiconducting paint is thermally cured. Next in step 524, the coated conductor is wrapped with a layer of half-lap semiconducting tape for a second length. Next in step 525, the wrap of semiconducting tape is cured by applying positive pressure and heat in a mold. Optionally, a second wrap of semiconducting tape is applied in step 526 and cured in step 527. Next in step 528, the wrapped conductor is coated with an outer coat of semiconducting paint. After the paint has dried, optionally, in step 529, the coat of paint is thermally cured. Finally, the method includes an optional step 530 of a portion of the conductor is wrapped with scaling tape.

A high voltage conductor utilizing a stress control coating using the alternating three layers as set forth above addresses the problem of reliable application of grading over the complex geometry of a stator coil end-turn that affects the performance and lifespan of the stator coil. The stress control coating system mitigates the detrimental effect of voids in the stress control coating which results in increased durability by reducing coronal surface discharges. When subject to voltage endurance testing, while conventional stress control coatings degrade and require repair in voltage endurance testing, the disclosed three-layer stress control coating does not degrade. As a result, a stator coil insulated with the disclosed three-layer stress control coating requires less frequent maintenance and repair than a stator coil with conventional insulation.

It will be apparent to those skilled in the art that various modifications and variations can be made to the HVRM of the present disclosure. It is intended that the specification and examples be considered as exemplary only, with a true scope of the disclosure being indicated by the following claims and their equivalents.

What is claimed is:

1. A conductor for a high voltage rotating machine, the conductor comprising:
 a conductor stack; and
 conductor insulation surrounding the conductor stack, the conductor insulation comprising a stress control coating,
 wherein the stress control coating comprises
  an inner layer comprising semiconducting paint,
  a middle layer comprising semiconducting tape, and
  an outer layer comprising semiconducting paint, and
 wherein the inner layer covers a first length of the conductor and the middle layer cover a second length of the conductor, and wherein the first length is longer than the second length.

2. The conductor of claim 1, wherein the conductor insulation further comprises:
 an inner corona protection layer surrounding the conductor stack;
 a groundwall insulation layer surrounding the inner coil protection; and
 an outer corona protection layer surrounding the groundwall insulation;
 wherein the stress control coating overlaps the outer coil protection layer.

3. The conductor of claim 1, wherein the stress control coating is applied over a length of an end-turn portion of the conductor.

4. The conductor of claim 3, wherein the length of the stress control coating is based on a rated voltage requirement of the conductor.

5. The conductor of claim 1, wherein the semiconducting paint comprises semiconducting particles and resin.

6. The conductor of claim 1, wherein the inner layer or outer layer comprises more than one coat of semiconducting paint.

7. The conductor of claim 1, wherein the semiconducting tape comprises fiber impregnated with semiconducting particle filled resin.

8. The conductor of claim 1, wherein the middle layer comprises more than one wrap of semiconducting tape.

9. A method of fabricating a conductor of a high voltage machine, the method comprising the steps of:
 applying a stress control coating to an insulated conductor, the applying the stress control coating comprising:
  coating the insulated conductor with at least one coat of semiconducting paint to form a coated conductor,
  wrapping the coated conductor with at least one wrap of semiconducting tape to form a wrapped conductor, and
  coating the wrapped conductor with at least one coat of semiconducting tape,
 wherein the coating of the insulator conductor is applied for a first length and the wrapping of the coated conductor is applied for a second length, and wherein the first length is longer than the second length.

10. The method of claim 9, further comprising forming an insulated conductor by applying an inner corona protection layer around a conductor stack, applying groundwall insulation around the inner corona protection layer, and applying an outer corona protection layer around the groundwall insulation.

11. The method of claim 9, wherein the stress control coating is applied to an end-turn of the stator coil for a length determined by a voltage requirement of the conductor.

12. The method of claim 10, wherein the semiconducting paint comprises the semiconducting paint comprises semiconducting particles and epoxy resin.

13. The method of claim 12, wherein the semiconducting particles comprise silicon carbide particles having a shape and size allowing for interlock.

14. The method of claim 10, wherein the semiconducting tape comprises fiber impregnated with semiconducting particle filled resin.

15. The method of claim 14, wherein the fiber comprises polyester fiber and glass fiber, and wherein the semiconducting particle is silicon carbide.

16. A conductor for a high voltage rotating machine, the conductor comprising:
 a conductor stack; and
 conductor insulation surrounding the conductor stack, the conductor insulation comprising a stress control coating,
 wherein the stress control coating comprises
  an inner layer comprising semiconducting paint,
  a middle layer comprising semiconducting tape, and
  an outer layer comprising semiconducting paint, and
 wherein the semiconducting paint that comprises semiconducting particles and epoxy resin, and
 wherein the semiconducting particles comprise silicon carbide particles having a shape and size allowing for interlock.

17. The conductor of claim 16, wherein the conductor insulation further comprises:
- an inner corona protection layer surrounding the conductor stack;
- a groundwall insulation layer surrounding the inner coil protection; and
- an outer corona protection layer surrounding the groundwall insulation,
- wherein the stress control coating overlaps the outer coil protection layer.

18. A method of fabricating a conductor of a high voltage machine, the method comprising the steps of:
- applying a stress control coating to an insulated conductor, the applying the stress control coating comprising:
  - coating the insulated conductor with at least one coat of semiconducting paint to form a coated conductor,
  - wrapping the coated conductor with at least one wrap of semiconducting tape to form a wrapped conductor, and
  - coating the wrapped conductor with at least one coat of semiconducting tape,
- wherein the semiconducting paint that comprises semiconducting particles and epoxy resin, and
- wherein the semiconducting particles comprise silicon carbide particles having a shape and size allowing for interlock.

19. The method of claim 18, further comprising forming an insulated conductor by applying an inner corona protection layer around a conductor stack, applying groundwall insulation around the inner corona protection layer, and applying an outer corona protection layer around the groundwall insulation.

* * * * *